US012727584B2

(12) United States Patent
Börries et al.

(10) Patent No.: US 12,727,584 B2
(45) Date of Patent: Sep. 8, 2026

(54) SYSTEM AND METHOD FOR RECORDING ANIMALS

(71) Applicant: Pixxize GmbH, Lindern (DE)

(72) Inventors: Alexander Börries, Cologne (DE); Bernhard Ulrich Börries, Bremen (DE)

(73) Assignee: Pixxize GmbH, Lindern (DE)

(*) Notice: Subject to any disclaimer, the term of this patent is extended or adjusted under 35 U.S.C. 154(b) by 73 days.

(21) Appl. No.: 17/792,097

(22) PCT Filed: Feb. 18, 2021

(86) PCT No.: PCT/EP2021/054063
§ 371 (c)(1),
(2) Date: Jul. 11, 2022

(87) PCT Pub. No.: WO2021/170488
PCT Pub. Date: Sep. 2, 2021

(65) Prior Publication Data
US 2023/0043110 A1 Feb. 9, 2023

(30) Foreign Application Priority Data
Feb. 27, 2020 (EP) .................................... 20159692

(51) Int. Cl.
*A01K 29/00* (2006.01)
*A45F 5/00* (2006.01)

(52) U.S. Cl.
CPC .............. *A01K 29/005* (2013.01); *A45F 5/00* (2013.01); *A45F 2005/002* (2013.01); *A45F 5/1533* (2025.01)

(58) Field of Classification Search
CPC ......... A01K 29/005; A01K 29/00; A45F 5/00; A45F 2005/002; A45F 2200/0533; G01G 17/08
See application file for complete search history.

(56) References Cited

U.S. PATENT DOCUMENTS

2016/0125276 A1* 5/2016 Spicola, Sr. ......... A01K 11/008 382/110
2016/0232656 A1* 8/2016 Taylor .................. B07C 5/3422
(Continued)

FOREIGN PATENT DOCUMENTS

JP 2014-044078 A 3/2014
JP 2016-059300 A 4/2016
(Continued)

OTHER PUBLICATIONS

International Search Report issued in PCT/EP2021/054063; mailed Mar. 24, 2021.
(Continued)

*Primary Examiner* — Tat C Chio
(74) *Attorney, Agent, or Firm* — Studebaker Brackett PLLC

(57) ABSTRACT

The invention relates to a system and a method for recording animals with a 3-D camera unit which is designed for producing at least one three-dimensional image of an animal, a computer unit which is designed for determining a weight of the animal based on the at least one three-dimensional image and with a data memory, in which weight data can be saved for each animal.

8 Claims, 1 Drawing Sheet

(56) References Cited

U.S. PATENT DOCUMENTS

| | | | | |
|---|---|---|---|---|
| 2018/0042584 | A1 | 2/2018 | Biondi | |
| 2020/0058405 | A1* | 2/2020 | Butterwick | G16H 50/30 |
| 2020/0178504 | A1* | 6/2020 | Moss | G06K 19/06037 |
| 2020/0225076 | A1* | 7/2020 | Fournier | G01G 17/08 |

FOREIGN PATENT DOCUMENTS

| | | | |
|---|---|---|---|
| JP | 2016-099165 | A | 5/2016 |
| JP | 2019-211364 | A | 12/2019 |
| WO | 2014/197631 | A1 | 12/2014 |

OTHER PUBLICATIONS

International Preliminary Report on Patentability (Chapter II) issued in PCT/EP2021/054063; completed Feb. 17, 2022.

"Notice of Reasons for Refusal" Office Action issued in JP 2022-552205; mailed by the Japanese Patent Office on Nov. 5, 2024.

An Office Action; mailed by the China National Intellectual Property Administration of the People's Republic of China on Mar. 21, 2025, which corresponds to Chinese Patent Application No. 202180008045.1 and is related to U.S. Appl. No. 17/792,097.

* cited by examiner

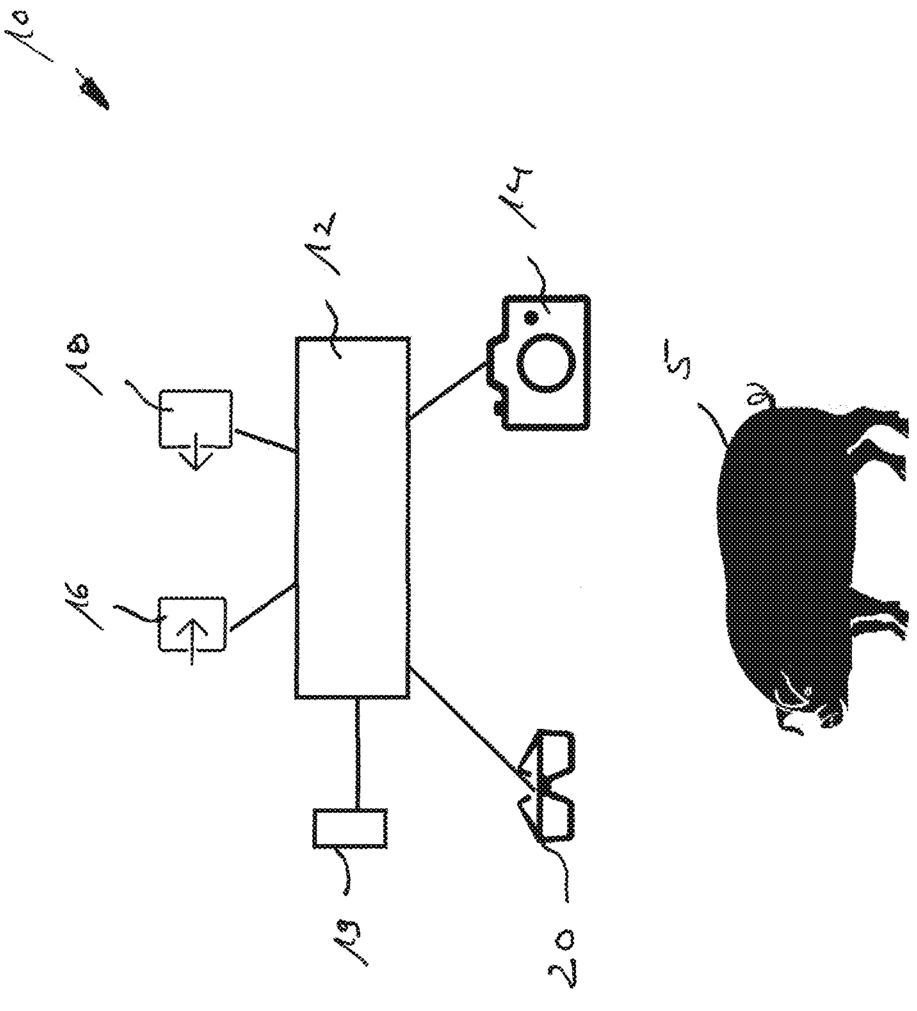
10
12
14
18
16
13
20
5

SYSTEM AND METHOD FOR RECORDING ANIMALS

CROSS-REFERENCE TO RELATED APPLICATIONS

This application is a U.S. National Stage Application of International Application No. PCT/EP2021/054063 filed on Feb. 18, 2021, which claims priority from European Patent Application No. 20159692.1 filed on Feb. 27, 2020, in the European Patent Office, the contents of which are herein incorporated by reference in their entireties.

BACKGROUND

Field

The invention relates to a system for recording animals according to claim 1 and to a method for recording animals according to claim 6.

Description of Related Art

Especially when breeding livestock, for example when fattening pig or cattle, the breeder has to decide at what time a particular animal can be passed on for further utilization, e.g. for sale or slaughter. One criterion for this is in particular the weight of an animal. However, especially in the case of larger stocks of animals the weighing of an animal on scales is a laborious task that is both time-consuming and cost-intensive. In addition, a special weighing means with a guiding-in and guiding-out for the animals has to be provided for this purpose. Moreover, a weighing process with guiding-in and guiding-out of the animals poses a strain on them.

In many cases a breeder therefore also makes his decision on the basis of visual inspection, whereby the weight of the animal is estimated. Depending on the experience of the breeder this may lead to erroneous weight estimations and therefore to inaccurate decisions.

BRIEF SUMMARY OF THE INVENTION

The invention is based on the object to provide a system and a method for recording animals, with which a weight of animals can be ascertained in a particularly efficient manner.

In accordance with the invention the object is achieved on the one hand by a system having the features of claim 1 and on the other hand by a method having the features of claim 6. Preferred embodiments of the invention are stated in the respective dependent claims.

BRIEF DESCRIPTION OF THE SEVERAL VIEWS OF THE DRAWINGS

The Figure illustrates a system according to an embodiment of the present application.

DETAILED DESCRIPTION OF THE INVENTION

According to the invention a system for recording animals is provided which is equipped with a 3-D camera unit which is designed for producing at least one three-dimensional image of an animal, a computer unit which is designed for determining a weight of the animal based on the at least one three-dimensional image and with a data memory, in which weight data can be saved for each animal.

A basic idea of the invention can be seen in the fact that the weight of an animal is not determined by weighing but by calculation based on one or several images of a 3-D camera unit.

The camera unit can be an electronic camera, by means of which at least one three-dimensional image of the animal can be generated. In this case, an electronically generated image can be converted into a depth image as well as a point cloud. Based on this at least one three-dimensional image a volume ascertainment and therefore a weight ascertainment of the animal can be carried out. These weight data thus generated can preferably be assigned to a particular animal and saved in a data memory. The system can be realized by a smartphone if this is designed for generating a three-dimensional image and provided with an appropriate software.

A particularly preferred embodiment of the invention resides in the fact that in order to form a mobile system a carrying means is provided, on which at least the 3-D camera unit is arranged, and that on the carrying means an energy store for energy supply is provided. The carrying means is in particular designed for being carried by a person so that images of one or several animals can be recorded and generated free-hand and without perspective limitation. Based on the images thus recorded a determination of weight data can be made for each animal by the computer unit. The carrying means has an energy store, more particularly an electric accumulator, for energy supply of the camera unit. By preference, provision is also made for a transmitting and/or receiving unit so that the camera unit can be connected to an external means that can feature the computer unit and the data memory in particular. Basically, the computer unit and the data memory can also be arranged directly on the carrying means.

Basically, the carrying means can be designed in any chosen way. According to a further development of the invention it is especially advantageous that the carrying means has a backpack, a vest, a carrying strap, glasses and/or headgear. The carrying means can thus can be carried by a person without significant effort, with the at least one camera unit being arranged such that image recording preferably takes place in the viewing direction of the person. Basically, however, provision can also be made for several camera units with different recording directions.

According to a further embodiment of the invention it is advantageous that the 3-D camera unit, an auxiliary means and/or the computer unit is designed for identifying an animal from a group of animals. The auxiliary means can, for example, be a transmitting or receiving means that can establish a communication connection e.g. to a transponder located on the animal or another identification means on the animal in order to read an identification code of the animal. Alternatively or additionally, an identification of the animal can also take place by means of the camera unit and/or the computer unit, in which case an animal can be recognized by characteristic, individual features. An identification of an animal allows the system to automatically assign the recorded image and weight data in a reliable manner to a particular animal.

According to a further embodiment of the invention it is especially advantageous that by the computer unit further data can be generated which relate, in particular, to an identification code of the animal, characteristic features of the animal and/or times for data recording. In this way, the determined weight data as well as further data can be reliably assigned to a particular animal at a certain point in time. Hence, for example a progression of the weight data over the course of time can be assigned to an animal. This permits a statement and also a forecast on the further development of the animal.

According to a further embodiment variant of the invention it is preferred that an input means and/or an output means are provided to input or output animal-related data in particular. The input and output means can have a wire-based or wireless connection to the computer unit. By way of the input means which can, for example, be a keyboard, a scanner or another means e.g. additional data can be input, for instance relating to the age or date of birth of the animal, the breed and more. The output means can be a screen, a printer or another output unit.

According to a further development of the invention it is particularly advantageous that the output means comprises a visual element, by which supporting data or symbols, which are saved for the animal or generated in the computer unit, can be displayed on observation of the at least one animal. The visual element can in particular be a screen or a display of a portable computer unit, a tablet computer or a smartphone or, in particular, glasses that allow the supporting data or symbols to be shown or displayed. As visual elements commonly used apparatuses and units can be employed that are sufficiently known for virtual reality systems. In particular, for an animal observed through such glasses the current weight, age, further data and/or handling instructions can be displayed for example.

Another preferred embodiment of the invention resides in the fact that parameter data are stored and, depending on the recorded data and the parameter data, the computer unit is designed to output a handling instruction relating to the animal. The parameter data can relate to a specific target weight or a target weight range, and on reaching the weight an indication is immediately displayed by the system that e.g. sale or slaughter of the animal is recommended. In particular, the parameter data can also comprise average values as nominal data for a weight development over time so that the system recognizes, for example, if an animal deviates significantly from the nominal data at a specific point in time. This can, for example, be a hint for a disease or improper treatment so that an indication can be displayed by the system as to a change of feeding or the undertaking of a veterinary measure or having the animal receive another kind of special treatment.

With regard to the method for recording animals in accordance with the invention provision is made in that by means of a 3-D camera unit at least one three-dimensional image of an animal is produced, based on the at least one three-dimensional image a weight of the animal is determined by means of a computer unit and weight data determined for each animal are saved in a data memory.

The method according to the invention can in particular be carried out using the previously described system. The advantages described beforehand can be achieved thereby.

A preferred embodiment variant of the method according to the invention resides in the fact that at least in an initial phase at least individual animals are weighed and the weight thus ascertained is additionally input into the computer unit and that the computer unit compares the weight ascertained by weighing with the weight data determined by calculation, wherein in the case of a deviation the computer unit changes a stored algorithm for determining the weight data based on the recorded image so that the weight data determined by calculation approximate or correspond to the weight ascertained by weighing. In this case, a machine learning system can be provided, in which the recorded geometrical data of an animal are used by an algorithm for weight ascertainment. For this, different algorithms can also be provided in combination in order to reach a weight ascertainment as precise as possible on the basis of the recorded images. The output of the weight data to the output means can take place in real-time.

According to a further method variant of the invention it is especially advantageous that recorded actual data of an animal are compared with specified nominal data, which are saved in the data memory or generated by the computer unit, and by the computer unit information on the treatment of the animal, for instance regarding feeding, veterinary treatment etc., is determined and output. In this way, an efficient and gentle fattening of an animal can be achieved.

For high data security provision is made according to a further development of the invention that the recorded data are saved in a tamper-proof manner, in particular being encrypted.

In conjunction with this it is particularly expedient that the recorded data are saved in a decentralized manner as a blockchain. Through the blockchain the data can be saved in a decentralized manner and the exclusive access of an individual as well as dependencies on individual places are avoided. Moreover, the infrastructure can be distributed and scaled across different places/participants without compromising security.

According to a further development of the invention it is especially advantageous that data from or in the computer unit are transmitted via an interface according to specified rights of operators.

In particular, a self-governed rights management on the basis of certificates can be provided. The encryption and certificates protect the data sovereignty and privacy of the individual participants without the assistance or control of a higher authority, i.e. an administration. Based on the certificates animals can, for example, be transferred on the market or an (electronic) marketplace and access to data can be granted individually. For example this can be useful when connecting to a veterinary or forwarding health data to a slaughterer for instance.

Moreover, a complete representation of the entire production and value chain is rendered possible. Since a deletion of data is not intended and not possible in the blockchain and previous data are linked with subsequent data for security, the entire history of an animal can be represented in a complete and tamper-proof manner.

Furthermore, a connection by a third-party and/or an internal interface (API) is possible. In addition, a connection of relevant government and/or institutional bodies can be provided, which can relate to veterinaries or disease and animal welfare for example. Moreover, provision can be made for an internal interface for connecting and enabling third-party applications, such as enterprise resource planning (ERP). The open connection can enable a maximum degree of benefit and market penetration (de facto standard).

Furthermore, adjusted access can be provided for different parties (fatteners, breeders, veterinary, end customer etc.). Adjusted access can be provided with limited functions aligned to the different parties. In addition, special tools for evaluation and utilization of the data can be provided, such as a marketplace with smart contracts, an evaluation of feed utilization, growth rates and other KPI and/or proof of organic breeding.

According to a further embodiment of the invention it is especially advantageous that by the computer unit further data can be generated which relate, in particular, to an identification code of the animal, characteristic features of the animal and/or times for data recording. In this way, the determined weight data as well as further data can be reliably assigned to a particular animal at a certain point in time.

Thus, for example a progression of the weight data over the course of time can be assigned to an animal. This permits a statement and also a forecast on the further development of the animal.

According to a further embodiment variant of the invention it is preferred that an input means and/or an output means are provided to input or output animal-related data in particular. The input and output means can have a wire-based or wireless connection to the computer unit. By way of the input means which can, for example, be a keyboard, a scanner or another means e.g. additional data can be input, for instance relating to the age or date of birth of the animal, the breed, the source of procurement etc. The output means can be a screen, a printer or another output unit.

According to a further development of the invention it is particularly advantageous that the output means comprises a visual element, by which supporting data or symbols, which are saved for the animal or generated in the computer unit, can be displayed on observation of the at least one animal. The visual element can in particular be a screen or a display or, in particular, glasses that allow the supporting data or symbols to be shown or displayed. As visual elements commonly used apparatuses and units can be employed that are sufficiently known for augmented reality systems.

In particular, for an animal observed through such glasses the current weight, age and a handling instruction can be displayed for example.

Another preferred embodiment of the invention resides in the fact that parameter data are stored and, depending on the recorded data and the parameter data, the computer unit is designed to output a handling instruction relating to the animal. The parameter data can relate to a specific target weight or a target weight range, and on reaching the weight an indication is immediately displayed by the system that e.g. sale or slaughter of the animal is recommended. In particular, the parameter data can also comprise average nominal data for a weight development over time so that the system recognizes, for example, if an animal deviates significantly from the nominal data at a specific point in time. This can, for example, be a hint for a disease or improper treatment so that an indication can be displayed by the system as to a change of feeding or the undertaking of a veterinary measure or having the animal receive another kind of special treatment.

With regard to the method for recording animals in accordance with the invention provision is made in that by means of a 3-D camera unit at least one three-dimensional image of an animal is produced, based on the at least one three-dimensional image a weight of the animal is determined by means of a computer unit and weight data determined for each animal are saved in a data memory.

The method according to the invention can in particular be carried out using the previously described system. The advantages described beforehand can be achieved thereby.

A preferred embodiment variant of the method according to the invention resides in the fact that at least in an initial phase at least individual animals are weighed and the weight thus ascertained is additionally input into the computer unit and that the computer unit compares the weight ascertained by weighing with the weight data determined by calculation, wherein in the case of a deviation the computer unit changes a stored algorithm for determining the weight data based on the recorded image so that the weight data determined by calculation approximate or correspond to the weight ascertained by weighing. In this case, a machine learning system can be provided, in which the recorded geometrical data of an animal are used by an algorithm for weight ascertainment. For this, different algorithms can also be provided in combination in order to reach a weight ascertainment as precise as possible on the basis of the recorded images. The output of the weight data to the output means can take place in real-time.

According to a further method variant of the invention it is especially advantageous that recorded actual data of an animal are compared with specified nominal data, which are saved in the data memory or generated by the computer unit, and by the computer unit information on the treatment of the animal, for instance regarding feeding, veterinary treatment etc., is determined and output. In this way, an efficient and gentle fattening of an animal can be achieved.

For high data security provision is made according to a further development of the invention that the recorded data are saved in a tamper-proof manner, in particular being encrypted.

In conjunction with this it is particularly expedient that the recorded data are saved in a decentralized manner as a blockchain. Through the blockchain the data can be saved in a decentralized manner and the exclusive access of an individual as well as dependencies on individual places are avoided. Moreover, the infrastructure can be distributed and scaled across different places/participants without compromising security.

In particular, a self-governed rights management on the basis of certificates can be provided. The encryption and certificates protect the data sovereignty and privacy of the individual participants without the assistance or control of a higher authority, i.e. an administration. Based on the certificates animals can, for example, be transferred on the market or an (electronic) marketplace and access to data can be granted individually. For example this can be useful when connecting to a veterinary or forwarding health data to a slaughterer for instance.

Moreover, a complete representation of the entire production and value chain is rendered possible. Since a deletion of data is not intended and not possible in the blockchain and previous data are linked with subsequent data for security, the entire history of an animal can be represented in a complete and tamper-proof manner.

According to a further development of the invention it is especially advantageous that data from or in the computer unit are transmitted via an interface according to specified rights of operators.

Furthermore, a connection by a third-party and/or an internal interface (API) is possible. In addition, a connection of relevant government and/or institutional bodies can be provided, which can relate to veterinaries or disease and animal welfare for example. Moreover, provision can be made for an internal interface for connecting and enabling third-party applications, such as enterprise resource planning (ERP). The open connection can enable a maximum degree of benefit and market penetration (de facto standard).

Furthermore, adjusted access can be provided for different parties (fatteners, breeders, veterinary, end customer etc.). Adjusted access can be provided with limited functions aligned to the different parties. In addition, special tools for evaluation and utilization of the data can be provided, such as a marketplace with smart contracts, an evaluation of feed utilization, growth rates and other KPI and/or proof of organic breeding.

A preferred embodiment of a system 10 according to the invention is shown schematically in the accompanying Figure. The system 10 comprises a computer unit 12, into which a data memory is integrated. The computer 12 can be a customary computer unit. A three-dimensional camera unit 14 that can have one or several objective lenses is preferably in wireless connection with the computer unit 12. By means of the 3-D camera unit 14 a three-dimensional image of an animal 5 can be produced. This three-dimensional image can be used in the 3D-camera unit 14 or in particular in the computer unit 12 to determine a weight of the animal based on a stored adaptive algorithm. Determined weight data can be output preferably in real-time by the system 10 according to the invention to a visual element 20 which can, in particular, be augmented or virtual reality glasses worn by a user.

By preference, the system 10 can be provided at least partially on a carrying means directly carried by a user. Provided on the carrying means is in particular the 3-D camera unit 14 with a corresponding data communication unit and an energy supply unit. Preferably, at least a part of the computer unit 12 can also be arranged on the carrying means. In this way, a determined weight as well as further data regarding an animal under observation can be directly displayed to a user especially when walking through a stable.

By way of an input means 16 further data can be input into the system 10 and in particular into the computer unit 12 so that these can also be displayed via the visual element 20 with regard to an animal observed. Additionally, one or several output means 18 can be provided, with which saved and/or determined data can be output from the computer unit 12.

Alternatively or additionally, an interface 19 for further input and/or output units can be provided.

The invention claimed is:

1. A system for recording animals with a 3-D camera unit which is designed for producing at least one three-dimensional image of an animal, a computer unit which is designed for determining a weight of the animal based on the at least one three-dimensional image and a data memory, in which weight data can be saved for each animal, wherein the 3-D camera unit, an auxiliary means and/or the computer unit is designed for identifying an animal from a group of animals, wherein an output means is provided to output animal-related data, wherein the output means comprises a visual element, by which supporting data, which are saved for the animal or generated in the computer unit, can be displayed on observation of the animal, wherein the system is configured that at least in an initial phase at least individual animals are weighed and the weight thus ascertained can be additionally input into the computer unit, and the computer unit is configured to compare the weight ascertained by weighing with the weight data determined by calculation, wherein in the case of a deviation the computer unit is configured to change a stored algorithm for determining the weight data based on the recorded image so that the weight data determined by calculation approximate or correspond to the weight ascertained by weighing, and wherein parameter data are stored, the parameter data comprising average data for a weight development over time, the computer unit is configured to compare the weight data at a point in time to the average data for the weight development over time and output a handling instruction to administer a veterinary measure for a disease of the animal in response to determining that the weight data at the point in time deviates from the average data for the weight development, the recorded weight data are saved in a data memory configured as a decentralized blockchain, the computer unit is configured to manage access to the recorded weight data via a self-governed rights management system based on certificates that enable a transfer of data access rights without a central administration authority, and the computer unit is configured to execute a smart contract to facilitate a transfer of the animal on an electronic marketplace based on the recorded weight data and the certificates.

2. The system according to claim 1, further comprising:

a carrying means on which at least the 3-D camera unit is arranged, and the carrying means including an energy store for energy supply.

3. The system according to claim 2, wherein the carrying means includes a backpack, a vest, a carrying strap, glasses and/or a headgear.

4. The system according to claim 1, wherein the computer unit is designed to generate further data which relate, in particular, to an identification code of the animal, characteristic features of the animal and/or times for data recording.

5. A method for recording animals with a system with a 3-D camera unit which is designed for producing at least one three-dimensional image of an animal, a computer unit which is designed for determining a weight of the animal based on the at least one three-dimensional image and a data memory, in which weight data can be saved for each animal, wherein the 3-D camera unit, an auxiliary means and/or the computer unit is designed for identifying an animal from a group of animals, wherein an output means is provided to output animal-related data, wherein the output means comprises a visual element, by which supporting data, which are saved for the animal or generated in the computer unit, can be displayed on observation of the animal, the method comprising:

in an initial phase, weighing at least individual animals and inputting the weight thus ascertained into the computer unit, producing by means of the 3-D camera unit the at least one three-dimensional image of the animal, determining, based on the at least one three-dimensional image, the weight of the animal by means of the computer unit, comparing, by the computer unit, the weight ascertained by weighing with the weight data determined by calculation, in the case of a deviation, the computer unit changing a stored algorithm for determining the weight data based on the recorded image so that the weight data determined by calculation approximate or correspond to the weight ascertained by weighing, storing parameter data, the parameter data comprising average data for a weight development over time, comparing, by the computer unit, the weight data at a point in time to the average data for the weight development over time and outputting a handling instruction to administer a veterinary measure for a disease of the animal in response to determining that the weight data at the point in time deviates from the average data for the weight development, saving the recorded weight data for each animal in the data memory configured as a decentralized blockchain, managing, by the computer unit, access to the recorded weight data via a self-governed rights management system based on certificates that enable a transfer of data access rights without a central administration authority, and executing a smart contract to facilitate a transfer of the animal on an electronic marketplace based on the recorded weight data and the certificates.

6. The method according to claim 5, further comprising:

comparing recorded actual weight data of an animal with specified data, which are saved in the data memory or generated by the computer unit, and by the computer unit, determining information on a treatment of the animal, including feeding and veterinary treatment.

7. The method according to claim 5, wherein the recorded weight data are saved in a tamper-proof manner, including being encrypted.

8. The system according to claim 1, wherein the computer unit is configured to determine that the weight data at the point in time deviates from the average data for the weight development by a threshold amount that is less than the average data for the weight development.

* * * * *